United States Patent
Aronson

(12) 
(10) Patent No.: US 6,265,030 B1
(45) Date of Patent: Jul. 24, 2001

(54) METHOD OF PRODUCING A DEHUMIDIFYING ELEMENT

(75) Inventor: Per-Johan Aronson, Sollentuna (SE)

(73) Assignee: Proflute AB, Vallentuna (SE)

(*) Notice: Subject to any disclaimer, the term of this patent is extended or adjusted under 35 U.S.C. 154(b) by 0 days.

(21) Appl. No.: 09/417,239

(22) Filed: Oct. 12, 1999

(30) Foreign Application Priority Data

Dec. 1, 1998 (SE) .................................................. 9804152

(51) Int. Cl.[7] ............................... B05D 3/00; B05D 1/18
(52) U.S. Cl. ................................. 427/397.8; 427/398.1; 427/434.2; 427/439; 162/111; 162/112; 162/135; 162/181.7
(58) Field of Search .................................... 162/111, 112, 162/135, 181.7; 427/397.7, 397.8, 398.1, 434.2, 439

(56) References Cited

U.S. PATENT DOCUMENTS

| | | |
|---|---|---|
| 3,826,703 | 7/1974 | Russell . |
| 4,411,216 | 10/1983 | Menser . |
| 4,911,775 * | 3/1990 | Kuma et al. .......................... 156/208 |
| 5,254,195 * | 10/1993 | Tseng et al. .......................... 156/184 |
| 5,423,934 * | 6/1995 | Vangbo et al. ........................ 156/208 |
| 5,505,769 * | 4/1996 | Dinnage et al. ........................ 96/153 |
| 5,863,322 * | 1/1999 | Van De Heisteeg et al. ....... 106/617 |

FOREIGN PATENT DOCUMENTS

| | | |
|---|---|---|
| 460 705 | 11/1989 | (SE) . |
| 462 671 | 8/1990 | (SE) . |
| WO 93/08910 | 5/1993 | (WO) . |

* cited by examiner

Primary Examiner—Shrive Beck
Assistant Examiner—Jennifer Calcagni
(74) Attorney, Agent, or Firm—Young & Thompson

(57) ABSTRACT

A method of impregnating paper with waterglass, such as soda waterglass or potassium silicate, the impregnated paper being usable as a dehumidifying element, wherein the method includes the steps of a) providing a sheet of paper such as facing paper and/or corrugated paper;

b) immersing the paper into a highly concentrated waterglass solution at a temperature within the range of 45–95° C., with the highly concentrated waterglass solution having a viscosity of at least 350 mPa.s at a temperature of 45° C.; and c) cooling the immersed paper with air at a temperature no greater than 35° C. and preferably no greater than 25° C.

10 Claims, 2 Drawing Sheets

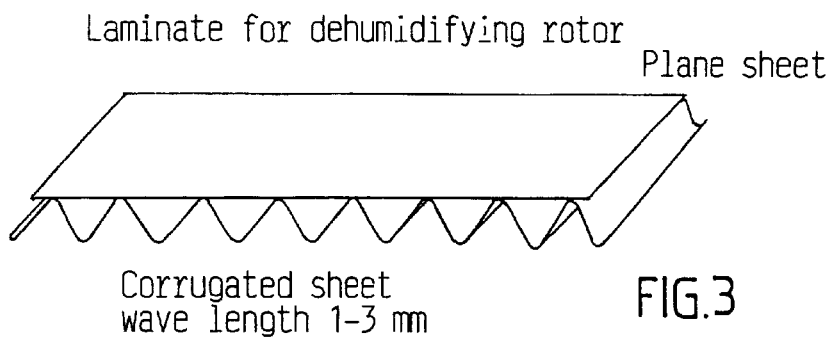
FIG. 3 Laminate for dehumidifying rotor
Plane sheet
Corrugated sheet wave length 1–3 mm
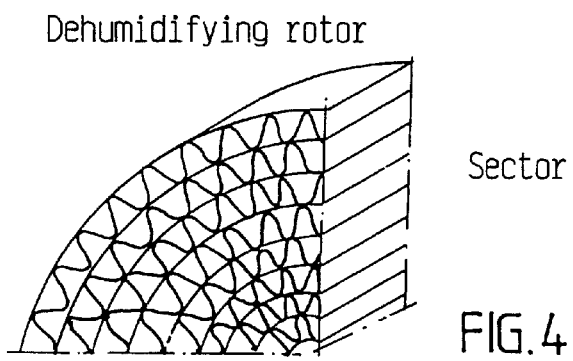
FIG. 4 Dehumidifying rotor
Sector
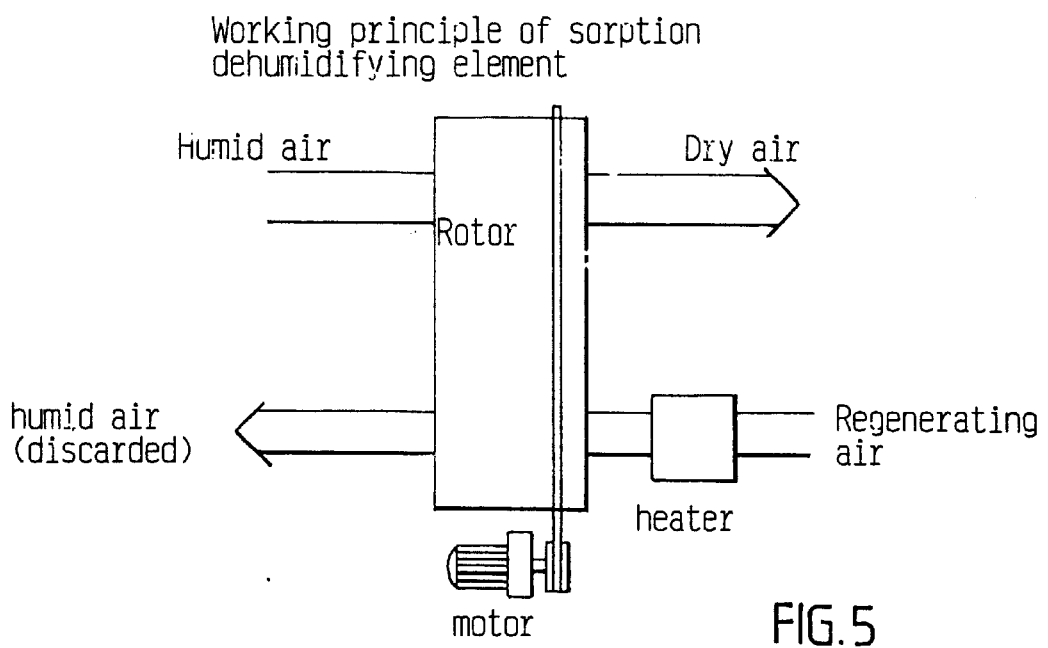
FIG. 5 Working principle of sorption dehumidifying element
Humid air → Rotor → Dry air
humid air (discarded) ← Rotor ← heater ← Regenerating air
motor

METHOD OF PRODUCING A DEHUMIDIFYING ELEMENT

The present invention relates to the dehumidification of air with the aid of a dehumidifying element that comprises a fibre matrix which has been impregnated with waterglass. More specifically, the invention relates to a method of producing dehumidification elements.

TECHNICAL BACKGROUND

Air is normally dehumidified with the aid of a dehumidifying element that can be fabricated by joining together a flat and a pleated fibre material that has moisture absorbing properties to form a laminate which is rolled into the form of a rotor or stacked in block form. A laminate of this nature is shown in FIG. 3. The dehumidifying element can be said to resemble corrugated paperboard that has been rolled up to form a rotor, or corrugated board that has been cut into lengths and the lengths stacked together to form a block. This element includes a structure that has many mutually parallel passageways. The pleats are normally from 1.5 to 3 mm in height and the passageways have a length of from 50 to 400 mm. A sector of one such rotor is shown in FIG. 4.

The initial roll or block is sawn and ground to form a rotor, which is often provided with a hub, spokes and/or cowling. The rotor forms the "heart" of an air dehumidifier, in which a fan or blower drives the air through the numerous rotor passageways. Because the walls of the passageways include a moisture absorbent, the air will be dry subsequent to passing through the rotor. A small heated air flow passes through a minor sector in the rotor and expels the moisture therefrom. Dry air is produced continuously, by continually rotating the rotor between the sections containing air to be dehumidified and sections through which heated air passes. The moisture extracted is carried away with the heated air flow in a separate passage system. This principle is illustrated in FIG. 5.

SE,B,460 705 teaches a method of producing a dehumidifying element in which paper comprised of ceramic fibres is impregnated with a waterglass solution either prior to or subsequent to lamination, and in which the paper is heated after being impregnated and dried to form a hydrated waterglass having a water content of 3–20%. The resultant matrix is then submerged in acid, so as to form silica-hydrogel.

SE,B,460 021 teaches a humidifying element that consists of a laminate which comprises a sheet of ceramic fibres that is corrugated on one side and has a paper thickness of 0.18–0.25 mm, a wave length of 2.5–4.2 mm and a wave height of 1.5–2.3 mm. This laminate is impregnated with an active silicon dioxide-aluminum oxide-aerogel that comprises 97–85% silicon dioxide and 3–15% aluminum oxide. The element is produced by dipping ceramic paper into an aqueous solution of waterglass, and then dried. The element is then dipped into an aqueous solution of aluminum sulphate and again dried.

SE,B,462 671 describes a method of producing a dehumidifying element in which a laminate consisting of an undulating sheet and a flat sheet is impregnated with an aqueous solution of waterglass, followed by drying the laminate and heating the same to a water content of 5–45%, whereafter the laminate is dipped in an aqueous metal salt solution and finally dried and heated.

SE,B,469 976 describes a method of producing dehumidifying elements in which paper webs that include a shapeable material, such as glass fibre or cellulose, are drenched with concentrated waterglass solution and dried to a dry solids content of about 45–65% with respect to the waterglass, and then corrugated. The corrugated laminate is then dried to a dry solids content of about 60–95%.

EP,B,0,642,384 describes a method of treating dehumidifying elements with the purpose of influencing the pore size of the silica gel. This is achieved by treating the dehumidifying elements with acid, base and a stabilising solution that contains salts of zinc, aluminium and phosphate. It is also stated in this prior application that waterglass is applied to the paper and that the waterglass is then dried. All of the aforesaid documents describe an impregnating stage followed by a drying stage in conjunction with the preparation of dehumidifying elements that comprise a silica gel matrix.

Drying stages are energy consuming and therewith add to production costs. Furthermore, sufficient quantities of waterglass cannot be readily applied when the solution has the low concentration required by known technology. Consequently, the dehumidifying elements produced will have a limited amount of silica gel and the capacity of said elements will not be optimal. There is therefore a need for improved methods that lower production costs and raise the performance and quality of the end product.

SUMMARY OF THE INVENTION

It has been found that the drying stage that follows immersion of paper into the waterglass solution can be eliminated totally and that the amount of silica gel matrix applied can be increased at the same time, by applying a method that includes the steps of a) providing a paper sheet, such as a sheet of facing paper and/or undulated paper;

b) submerging the paper in a highly concentrated waterglass solution at a temperature in the range of 45–95° C.; and c) cooling the submerged paper with air at a temperature not higher than 35° C. and preferably at 25° C. at the highest.

Definitions

The term "waterglass" as used in this document refers to aqueous solutions of sodium silicate ("soda waterglass") or potassium silicate. Sodium waterglass and potassium silicate are often written as $(Na_2O)_m(SiO_2)_n$ and $(K_2O)_m(SiO_2)_n$ respectively, from which it will be seen that the mole ratio between the two oxides (n/m) can vary. In the case of the present invention, soda waterglass with n/m within the range of 3.3 to 3.4 is preferred, and waterglass with n/m from 3.2 to 3.4 is particularly preferred.

The expression "highly concentrated waterglass" as used in this document refers to waterglass that has a lower viscosity limit of at least 350 mPa·s at 45° C. The upper viscosity limit is 800 mPa·s at 95° C. The viscosity of highly concentrated waterglass at room temperature is so high as to make it extremely difficult to submerge paper in the waterglass and for the waterglass to wet the paper at this temperature. According to known technology, a typically concentrated waterglass at 20° C. has a viscosity of up to 200 mPa·s. Highly concentrate waterglass, on the other hand, has a much greater viscosity at 20° C. and in its least concentrated form can be likened to cold syrup or treacle.

The term "paper" as used in this document refers to sheets produced from organic fibres, such as cellulose, or inorganic fibres, such as ceramic fibres, glass fibres, slag fibres, carbon fibres and mineral fibres, and mixtures thereof. Inorganic fibres are preferred. It is also preferred to use glass fibres and/or mineral fibres in mixture with up to 20% cellulose fibres or synthetic fibres. The paper will typically have a thickness of 0.1–0.3 mm. The wave height of the undulating paper will typically be from 1–5 mm and the wave length typically from 1.5–7 mm. The paper will have a typical weight per unit area of 20–50 g/m².

DETAILED DESCRIPTION OF THE INVENTION

As mentioned earlier, the invention relates to a method of producing dehumidifying elements that comprise a paper matrix that has been impregnated with waterglass which is later converted to silica gel. Instead of using concentrated waterglass as a silica gel starting material, there is used highly concentrated waterglass. This waterglass is so highly viscous as to render it practically impossible to impregnate paper at room temperature. However, the highly concentrated waterglass becomes fluid at temperatures of from 45–95° C. and functions in the manner of concentrated waterglass. The paper that is to be impregnated is thus immersed into hot highly concentrated waterglass and then cooled with air having a temperature of 35° C. at the highest, preferably at 25° C. at the highest. It is not necessary to dry the paper. The cooled, impregnated paper also has good adhesive properties and can be easily joined to other paper.

Highly concentrated waterglass may be prepared, for instance, by evaporating off some of the water in concentrated waterglass, prior to manufacture.

When paper is impregnated conventionally with waterglass, the impregnated paper is heat-dried. In conjunction with this process, the waterglass becomes fluid and begins to run. There is no danger of this happening in the process according to the invention, since the highly concentrated waterglass solidifies or thickens in the cooling stage.

In the production of dehumidifying elements, the waterglass impregnated paper is dipped into a solution containing both acid and metal salt, wherewith the composition of the solution is chosen so that the product will obtain a high mechanical strength and a high dehumidifying capacity. SE-B-462 671 discloses examples of appropriate metal salts. Suitable acids are acids ranging from sulphuric acid to metal sulphates, phosphoric acid to metal phosphates, nitric acid to metal nitrates and hydrochloric acid to metal chlorides. A metal salt solution provides a gel of good stability. However, because a low pH is required in order to obtain a high moisture absorption capacity there is required a large salt surplus. Although the gel will have a high capacity when solely acid is used, the gel will readily break down when subjected to normal dehumidification processes.

The matrix obtained in these stages of manufacture is washed with water and dried to a finished product.

This process has many advantages. For instance, the process enables more waterglass to be applied per unit of surface area of the paper, since the highly concentrated waterglass is, of course, more concentrated than concentrated waterglass. This provides an end product whose moisture absorbing capacity is much greater than would otherwise be the case. It also results in a reduction in energy consumption, and therewith in production costs, since it is not necessary to dry the paper subsequent to its impregnation. Large quantities of energy are consumed in drying wet paper, since it is necessary to use either hot air or IR-lamps. Paper treated in accordance with the invention does not require the provision of expensive drying equipment. Finally, the product has better properties than known products, since there is no danger of the waterglass beginning to run after impregnation.

BRIEF DESCRIPTION OF THE DRAWINGS

The invention will now be described in more detail with reference to the accompanying drawings.

FIG. 3 shows a laminate consisting of facing paper and corrugated paper used in the manufacture of the rotor in an air dehumidifier.

FIG. 4 illustrates a sector of the finished dehumidifying rotor. The rotor is comprised of a laminate of the kind shown in FIG. 3, this laminate having been wound about a shaft in manufacturing the rotor; and FIG. 5 illustrates the working principle of a dehumidifying element. The air from which moisture shall be extracted is passed through passageways in a rotary dehumidifying element. Heated air is, at the same time, passed in counterflow through another sector of the rotating dehumidifying element.

Figure 1:
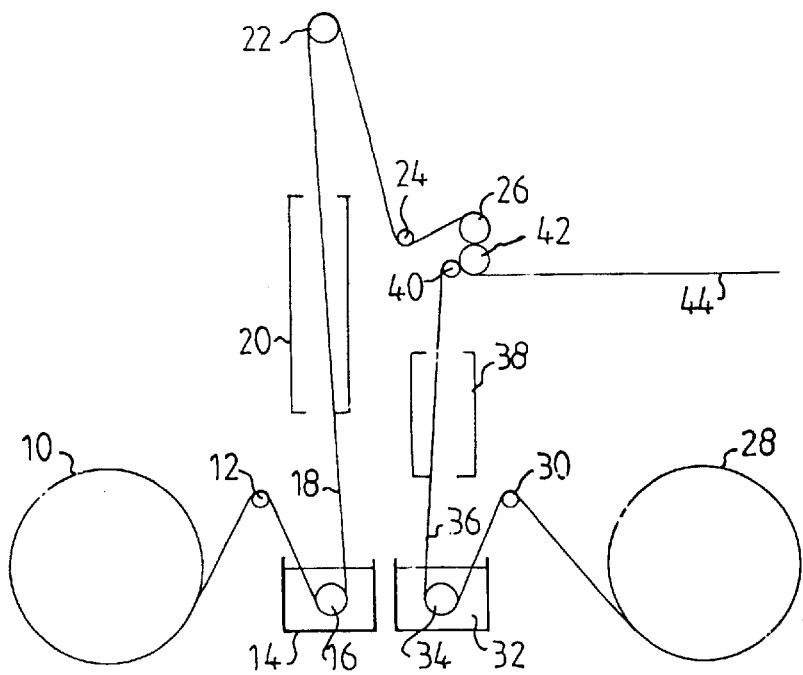
FIG. 1 illustrates schematically the principle of a process for manufacturing a dehumidification element in accordance with the invention.

The plant illustrated in FIG. 1 includes paper rolls 10 and 28. A paper web taken from the roll 10 is led over a guide roller 12 down into a bath 14 that contains heated highly concentrated waterglass. Data for typical highly concentrated waterglass suitable for use in conjunction with this invention can be seen from Table 1 below.

TABLE 1

| Examples of data for highly concentrated waterglass solutions | |
| --- | --- |
| Mole ratio SiO$_2$/Na$_2$O | 3.3–3.4 |
| Density (kg/dm3) | 1.41–1.45 |
| Usable within the range | 45–90° C. |
| Optimal density (kg/dm$^3$) | 1.43 |
| Optimal temperature | 70° C. |

Table 2 below sets forth two examples of highly concentrated waterglass solutions and their respective viscosities. The solutions are chosen to lie close to the viscosity limits applicable to highly concentrated waterglass solutions in accordance with the invention.

TABLE 2

| Examples of data for two highly concentrated waterglass solutions | | |
| --- | --- | --- |
| | Example A | Example B |
| Mole ratio SiO$_2$/Na$_2$O | 3.35 | 3.35 |
| Density (kg/dm$^3$) | 1.425 | 1.450 |
| Viscosity | 377 mPa:s at 45° C. | 800 mPa.s at 90° C. |

The paper web 18 is led down beneath the level of the highly concentrated hot waterglass solution in the bath 14 with the aid of a roller 16 submerged in the solution, said waterglass solution having a temperature of from 45–95° C. As the paper web 18 passes through the bath 14 the web is soaked with highly concentrated waterglass solution to a point of saturation. The saturated paper web is then passed up through a cooling chamber 20 in which air at room temperature is blown onto the web 18. The web 18 is then delivered via guide rollers 22 and 24 to a conjugating roll 26 to form a conjugated paper web that includes a large number of small pleats. The corrugated paper, or undulated paper, will typically have a wave height of 1–5 mm and a wave length of 1.5–7 mm, as before mentioned. A second paper web 36 is taken from the paper storage roll 28 and delivered via a guide roll 30 to a bath 32 which contains heated highly concentrated water glass solution, into which the paper web 36 is immersed via a roller 34. The paper web 36 is there soaked and allowed to pass up through the cooling chamber 38, in which room temperature air is blown onto the web 36. The web 36 is passed from the cooling chamber 38, via a guide roller 40, to a combining roll 42 where the two paper webs 18 and 36 are joined to form an impregnated corrugated paperboard matrix 44. Because the impregnated paper webs 18 and 36 will readily adhere to one another after the cooling stage, no glue need be applied in joining said webs together.

Figure 2:
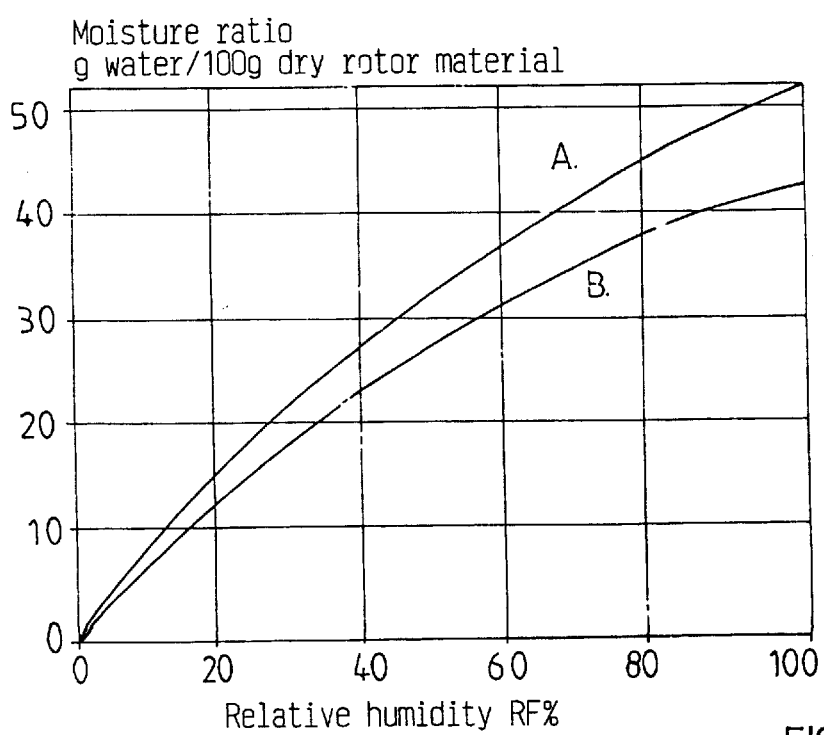
FIG. 2 is a diagram which includes equilibrium curves for dehumidifying element material. The moisture ratio (g absorbed water/100 g bone dry material) is plotted as a function of the relative humidity of material produced in accordance with the invention (A) on the one hand and for material produced in accordance with known technology (B) on the other hand.

The inventive process results in a matrix that contains from 10–25% more silica gel than matrices produced in accordance with known technology on the basis of the same type of paper, the same applied volume of waterglass, and the same type of matrix with respect to geometry and dimensions. This is illustrated in FIG. 2, which shows two equilibrium curves for material in dehumidifying elements. Curve A refers to material produced in accordance with the invention, while curve B represents a material produced in accordance with SE 469 976. A prerequisite is that A and B have been produced from identical fibre paper as starting material and that the paper has been coated with equally thick layers of highly concentrated waterglass in respective curve A and typically concentrated waterglass in respective curve B.

What is claimed is:

1. A method of impregnating paper with waterglass to obtain an impregnated paper for use as a dehumidifying element, the method comprising the steps of:

a) providing a paper sheet;

b) immersing the paper sheet into a highly concentrated waterglass solution at a temperature within the range of 45–95° C.; said highly concentrated waterglass solution being selected from the group consisting of soda waterglass and potassium silicate, and having a viscosity of at least 350 mPa.s at a temperature of 45° C.; and c) cooling the immersed paper with air at a temperature not greater than 35° C.

2. The method according to claim 1, wherein the immersed paper is cooled with air at a temperature not greater than 25° C.

3. The method according to claim 1, wherein the highly concentrated waterglass solution has a viscosity not greater than 800 mPa.s at a temperature of 95° C.

4. The method according to claim 1, wherein the waterglass is soda waterglass.

5. The method according to claim 4, wherein the mole ratio between $SiO_2$ and $Na_2O$ in the soda waterglass is 3.2–3.5.

6. The method according to claim 5, wherein the mole ratio between $SiO_2$ and $Na_2O$ in the soda waterglass is 3.3–3.4.

7. The method according to claim 1, wherein the paper is produced from inorganic fibers selected from the group consisting of ceramic fibers, glass fibers, slag fibers, carbon fibers and mineral fibers, admixed with 0–20% cellulose fibers or synthetic fibers.

8. The method according to claim 7, wherein the paper has a weight per unit area of 20–50 g/m2.

9. The method according to claim 1, further comprising dipping the paper after step c) into an aqueous solution of a metal salt, selected from the group consisting of aluminum sulphate, magnesium sulphate, primary aluminum phosphate ($Al_2O_3$, $9P_2O_5$), magnesium chloride and aluminum nitrate; and an acid selected from the group consisting of sulfuric acid, phosphoric acid, hydrochloric acid and nitric acid.

10. The method according to claim 1, wherein the paper is at least one of facing paper and corrugated paper.

* * * * *